United States Patent Office 3,497,771
Patented Feb. 24, 1970

3,497,771
SERIES CAPACITOR PROTECTOR USING DAMPING RESISTOR COIL COMBINATION
Pentti Kalervo Korkka, Tapiola, Finland, assignor to Oy Nokia AB, Helsinki, Finland, a corporation of Nokia, Finland
Filed May 31, 1967, Ser. No. 642,458
Int. Cl. H02h 7/16, 1/00, 7/00
U.S. Cl. 317—12                           3 Claims

ABSTRACT OF THE DISCLOSURE

A device for reducing the continuous losses of a damping resistor in a damping resistor-damping coil combination used in limiting and damping the discharge current in series capacitors upon the functioning of the main spark gap or the closing of the by-pass circuit breaker, the resistor-coil combination being connected in series with the series capacitor in such a way that the discharge current is limited and damped also in case a so-called platform short circuit occurs, which mounting arrangement causes the line current to flow through the damping resistor-damping coil combination. At least a portion of the damping resistor under normal operation conditions is disengaged from the circuit by means of a rapid switching means, such as a spark gap in order to avoid continuous losses, the spark gap connecting at least a portion of the damping resistor to the damping circuit if the voltage across the coil exceeds a predetermined value.

---

Figure 1:
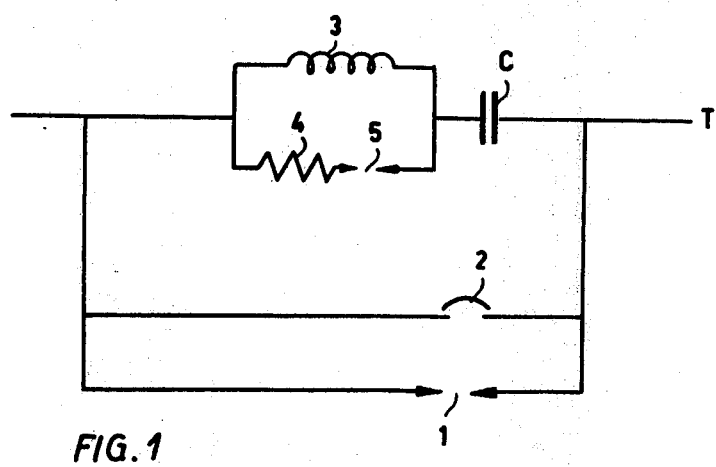

The present invention relates to a device for reducing the continuous losses of a damping resistor in a damping resistor-damping coil combination used in limiting and damping the discharge current in series capacitors upon the functioning of the main spark gap or the closing of the by-pass circuit breaker, said resistor-coil combination being connected in series with the series capacitor in such a way that the discharge current is limited and damped also in case a so called platform short circuit occurs, which mounting arrangement causes the line current to flow through the damping resistor-damping coil combination.

In by-passing series capacitor banks, used in power transmission lines, it is important to limit the discharge current to a value not endangering capacitor units. Generally a spark gap parallelled with the capacitor is used to protect the capacitor against overvoltage caused by fault current due to a fault in the power transmission line. The ignition voltage of such a spark gap is usually 2.9 ... 3.5 times $\sqrt{2} \cdot U_N$, where $U_N$ is the rated voltage of the capacitor bank. Upon the functioning of the spark gap the energy stored in the capacitor is discharged through the spark gap. In order to prevent the discharge current from increasing too much, which could damage the capacitor or the spark gap, a damping circuit, usually consisting of a damping coil and a damping resistor, is connected to the circuit. Because the resistance of the circuit wiring and the damping coil is small the energy of the capacitor bank has to be discharged mainly into the damping resistor. Consequently, the damping resistor has to be dimensioned low-ohmic in order to achieve a sufficiently rapid damping.

Parallelled with the spark gap there is usually a by-pass circuit breaker which can be used in by-passing the capacitor bank. When the capacitor bank is switched off by means of the by-pass circuit breaker the physical basic situation is the same as after the spark gap has ignited, but when the voltage is normally only $\sqrt{2} \cdot U_N$.

According to the prior art the damping resistor and the damping coil shunted therewith are connected in series with the capacitor bank in the power transmission line. Another way is to arrange the damping circuit outside the sphere of influence of the line current. A third way is to divide the damping circuit into two portions whereby one portion of the circuit is placed in the power transmission line and the other outside the sphere of influence of the line current.

The disadvantage of the first mentioned system is that when the line current is flowing continuously through the damping coil and the damping resistor this causes substantial losses therein. The second proposed system does not have that disadvantage when the capacitor bank is in function, but said losses appear when the capacitor bank is by-passed by means of the by-pass circuit breaker. In said system there is a risk that a so called platform short circuit or other similar flashover from the capacitor bank to the platform, functioning as a support for the bank, might endanger the capacitor bank. The third proposed arrangement is a compromise between the two first mentioned. According to this arrangement it has been possible to lessen the disadvantages to some extent.

It is the purpose of this invention to decrease the power losses due to the protective means of the capacitor bank while the capacitor bank, at the same time, is protected against so called platform short circuits or other similar flashovers.

The device according to the invention is characterized in that at least a portion of the damping resistor under normal operation conditions is disengaged from the circuit by means of a rapid switching means, such as a spark gap, in order to avoid continuous losses, and that said spark gap connects at least a portion of the damping resistor to the damping circuit if the voltage across the coil exceeds a predetermined value due to for instance the functioning of the main spark gap, the closure of the by-pass circuit breaker, a platform short circuit, a surge passing the series capacitor and the damping coil, etc.

By means of the present invention a saving in effect of about 5 ... 25 kw. per main spark gap is achieved, depending on the size and voltage of the capacitor bank, while, on the same time, the protective means functions in case platform short circuits or other similar flashovers occur. Because the damping resistor is not continuously connected, a lower starting temperature can be considered in the dimensioning of the resistor, and thus the mass thereof can be reduced.

Figure 2:
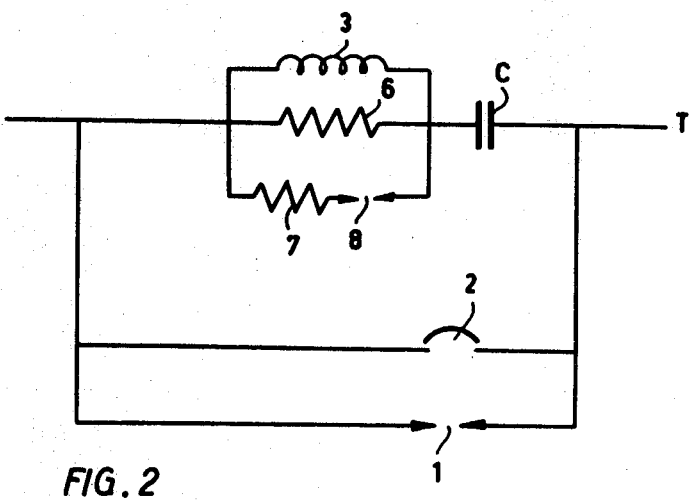

The invention will be described more precisely with reference to the accompanying drawings, where FIGURE 1 shows an embodiment of the invention where the damping resistor is entirely detached from the circuit, and FIGURE 2 shows an embodiment of the invention where the damping resistor is partially detached from the circuit.

In FIGURE 1 of the drawing, T is a phase conductor of the power transmission line, C is a capacitor bank, 1 is the main spark gap, 2 is a by-pass circuit breaker, 3 is a damping coil, 4 is a damping resistor, 5 is the spark gap of the damping resistor or another similar rapid switching means. Upon the functioning of the main spark gap 1 or the by-pass circuit breaker 2 the spark gap 5 connects the damping resistor 4 to the circuit in such a way that the damping circuit becomes completed. The functions of the spark gap can, if desired, be made controllable for instance as known in the prior art in such a way that the connection occurs at a certain voltage, e.g. 0.1 ... 0.5 $U_N$.

It is essential that the spark gap 5 of the resistor does not remain connected permanently after the functioning moment of the main spark gap or the by-pass circuit breaker but interrupts automatically or by forced motion the contact established at said moment after the capacitor bank has been discharged. Thus the spark gap must have a self-quenching construction or be provided with spark extinguishing means.

The coupling circuit according to FIGURE 1 is particularly intended for power transmission lines without carrier wave communications. If carrier wave communications are provided then a coupling circuit according to FIGURE 2 is used.

In FIGURE 2 the damping resistor 4 according to FIGURE 1 is replaced by two resistors 6 and 7, the resistor 6 being permanently connected and the resistor 7 being detached from the circuit by means of a spark gap or another rapid switching means 8. The resistance values of the resistors 6 and 7 are chosen in such a way that the resistor 6 is relatively high-ohmic, e.g. 15 ohms, while the resistor 7 is low-ohmic, e.g., 1.9 ohms. Upon the functioning of the main spark gap 1 or the by-pass circuit breaker 2 the spark gap 8 connects the resistor 7 to the circuit. The shunted resistors 6 and 7, totaling 1.7 ohms, constitute the actual effective damping resistance.

What I claim is:

1. A series capacitor installation for an alternating current line, such as a power transmission line, said installation comprising a capacitor connected in series in said line, a damping resistor-damping coil combination connected in said line in series with said capacitor, a main spark gap device connected in parallel with said capacitor and damping resistor-damping coil combination and adapted to break down and become conducting whenever the instantaneous voltage across the capacitor exceeds a predetermined value, a by-pass switch connected in parallel with the main spark gap device, and rapid switching means for keeping the damping resistance under normal operation conditions disengaged from the circuit, said rapid switching means and said damping resistance being connected in series, said damping resistance and the rapid switching means being connected in parallel with said damping coil to avoid continuous losses, said rapid switching means being adjusted to connect said damping resistance to the damping circuit if the voltage across the coil exceeds a predetermined value.

2. An installation as claimed in claim 1 comprising a second damping resistance means connected in parallel with the coil and with the first resistance means and rapid switching means.

3. An installation as claimed in claim 1 wherein said rapid switching means is constituted as a spark gap.

References Cited

UNITED STATES PATENTS

| | | | |
|---|---|---|---|
| 3,099,789 | 7/1963 | Perrins | 323—9 |
| 3,376,475 | 4/1968 | Greber | 317—11 |
| 3,012,118 | 12/1961 | Edmunds | 200—88 |
| 3,356,901 | 12/1967 | Kramer | 317—20 |
| 3,356,900 | 12/1967 | Kalkner | 317—20 |
| 3,099,828 | 7/1963 | Kelley | 340—248 |

JOHN W. HUCKERT, Primary Examiner

B. ESTRIN, Assistant Examiner

U.S. Cl. X.R.

315—35, 36, 241, 244, 245; 317—11, 53